(12) United States Patent
Tremelling et al.

(10) Patent No.: US 12,046,880 B2
(45) Date of Patent: Jul. 23, 2024

(54) DEVICE AND METHOD FOR SEPARATING WIRES AND SEALING A CONDUIT

(71) Applicant: ABB Schweiz AG, Baden (CH)

(72) Inventors: Darren Tremelling, Raleigh, NC (US); Jonah Kadoko, Raleigh, NC (US); Nikolaus Zant, Raleigh, NC (US); Corey Stoner, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 94 days.

(21) Appl. No.: 17/513,617

(22) Filed: Oct. 28, 2021

(65) Prior Publication Data
US 2023/0135895 A1    May 4, 2023

(51) Int. Cl.
| | |
|---|---|
| *H02G 1/00* | (2006.01) |
| *B29C 44/12* | (2006.01) |
| *B29C 44/34* | (2006.01) |
| *B29L 31/34* | (2006.01) |
| *F16L 3/22* | (2006.01) |
| *F16L 55/11* | (2006.01) |
| *H02G 3/04* | (2006.01) |

(52) U.S. Cl.
CPC ........... *H02G 1/00* (2013.01); *B29C 44/1228* (2013.01); *B29C 44/35* (2013.01); *F16L 3/222* (2013.01); *F16L 55/1116* (2013.01); *H02G 3/0462* (2013.01); *B29L 2031/3462* (2013.01)

(58) Field of Classification Search
CPC ....... H02G 1/00; H02G 15/00; B29C 44/1228
See application file for complete search history.

(56) References Cited

U.S. PATENT DOCUMENTS

| | | | | |
|---|---|---|---|---|
| 4,607,469 A | * | 8/1986 | Harrison | F16L 5/02 52/220.8 |
| 5,124,507 A | * | 6/1992 | Dehling | H02G 15/113 174/76 |
| 5,245,133 A | * | 9/1993 | DeCarlo | H02G 15/013 174/76 |
| 5,789,707 A | * | 8/1998 | Damm | H02G 15/113 174/650 |
| 5,831,217 A | * | 11/1998 | Jarvis | H02G 3/22 174/76 |

(Continued)

FOREIGN PATENT DOCUMENTS

| | | | | | |
|---|---|---|---|---|---|
| CN | 113922299 A | * | 1/2022 | | |
| DE | 10018009 A1 | * | 10/2001 | ........... | H02G 15/003 |

(Continued)

OTHER PUBLICATIONS

Machine Translation KR20180067289A (Year: 2018).*

(Continued)

*Primary Examiner* — Jacob T Minskey
*Assistant Examiner* — Ayne K. Swier
(74) *Attorney, Agent, or Firm* — Greenberg Traurig, LLP

(57) ABSTRACT

An insert device for sealing a conduit, wherein at least one component of the insert device is configured to separate and position at least one wire in the conduit in order to create a space or inner volume for a sealant to be introduced thereinto. The insert device can have a nozzle configured to allow precise injection of the sealant into the inner volume. The insert device can be operated for quick and reliably repeatable sealing of conduits.

20 Claims, 7 Drawing Sheets

(56) References Cited

U.S. PATENT DOCUMENTS

| | | | | |
|---|---|---|---|---|
| 6,225,562 B1* | 5/2001 | Fujishita | ............ | B60R 16/0222 |
| | | | | 174/152 G |
| 2012/0267146 A1* | 10/2012 | Petry | ......................... | F16L 9/19 |
| | | | | 29/869 |
| 2018/0254621 A1* | 9/2018 | Coenegracht | ........ | H02G 15/007 |

FOREIGN PATENT DOCUMENTS

| | | | | | |
|---|---|---|---|---|---|
| JP | 07296659 A | * | 11/1995 | ......... | B60R 16/0222 |
| KR | 20180067289 A | * | 6/2018 | .......... | B29C 48/001 |

OTHER PUBLICATIONS

Machine translation JPH07296659A (Year: 1995).*
Machine translation DE10018009A1 (Year: 2001).*
Machine translation CN113922299A (Year: 2021).*

* cited by examiner

DEVICE AND METHOD FOR SEPARATING WIRES AND SEALING A CONDUIT

FIELD

This disclosure relates generally to sealing a conduit containing wires.

BACKGROUND

Sealing a conduit is desired in hazardous locations and to mitigate airflow through the conduit due to temperature or pressure gradients.

SUMMARY

In some embodiments of a device for positioning cables and sealing a conduit, the device comprises a cable-separating component, wherein the cable-separating component includes a body, wherein the body is configured with removable portions, wherein when the removable portions are removed from the body, the body has a notch, wherein the notch is configured (e.g., shaped) to secure a cable; and a nozzle, wherein the nozzle includes a body, wherein the body defines a tubular channel, a first end, and a second end, wherein the second end is opposite the first end along the body, wherein the second end is connected to the cable-separating component such that the tubular channel continues entirely through the body of the cable-separating component.

In some embodiments, the device further comprises a second cable-separating component, wherein the second cable-separating component is connected to the cable-separating component, wherein the second cable-separating component includes a second body, wherein the second body is configured with another removable portions, wherein when the another removable portions are removed from the second body, the second body has a second notch, wherein the second notch is configured to secure the cable.

In some embodiments, the device further comprises at least one strut, wherein the second cable-separating component is connected to the cable-separating component via the at least one strut.

In some embodiments of the device, the cable-separating component and the second cable-separating component are made of a different material than the nozzle.

In some embodiments of the device, the cable-separating component and the second cable-separating component comprise a polymer.

In some embodiments of the device, the cable-separating component and the second cable-separating component are flexible with a durometer range of about 40 Shore A to about 100 Shore A.

In some embodiments of the device, the removable portions include multiple knockout portions for each notch, wherein the multiple knockout portions can be successively removed to progressively enlarge the notch.

In some embodiments of the device, the cable-separating component tapers downwards and away from the nozzle.

In some embodiments of the device, a longitudinal centerline of the nozzle extends substantially parallel to a longitudinal centerline of the device.

In some embodiments of the device, the nozzle is corrugated.

In some embodiments, a method of installing a device for separating cables and sealing a conduit comprises placing the device in the conduit; connecting the cables to a cable-separating component of the device; moving the device to a desired position within the conduit; and delivering a sealant to the device, thereby sealing the device to the conduit.

In some embodiments of the method, the cable-separating component includes a body, wherein the body is configured with removable portions, and further comprising removing the removable portions from the body to form notches on the body.

In some embodiments of the method, connecting the cables to the cable-separating component of the device comprises placing the cables in the notches.

In some embodiments of the method, the cable-separating component includes a body, wherein the body is configured with notches and removable portions to enlarge the notches, and wherein connecting the cables to the cable-separating component of the device comprises placing the cables in the notches.

In some embodiments of the method, placing the cables in the notches comprises leaving the removable portions attached to the body.

In some embodiments of the method, delivering the sealant to the device comprises delivering the sealant to the device via a nozzle of the device.

In some embodiments of the method, delivering the sealant to the device comprises delivering an irritant.

In some embodiments of the method, delivering the sealant to the device comprises delivering a foamed polymer.

In some embodiments of the method, moving the device to the desired position within the conduit comprises sliding the device longitudinally along the conduit and away from an opening of the conduit.

In some embodiments of the method, the method comprises delivering the sealant to the device after moving the device to the desired position within the conduit.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Figure 1:
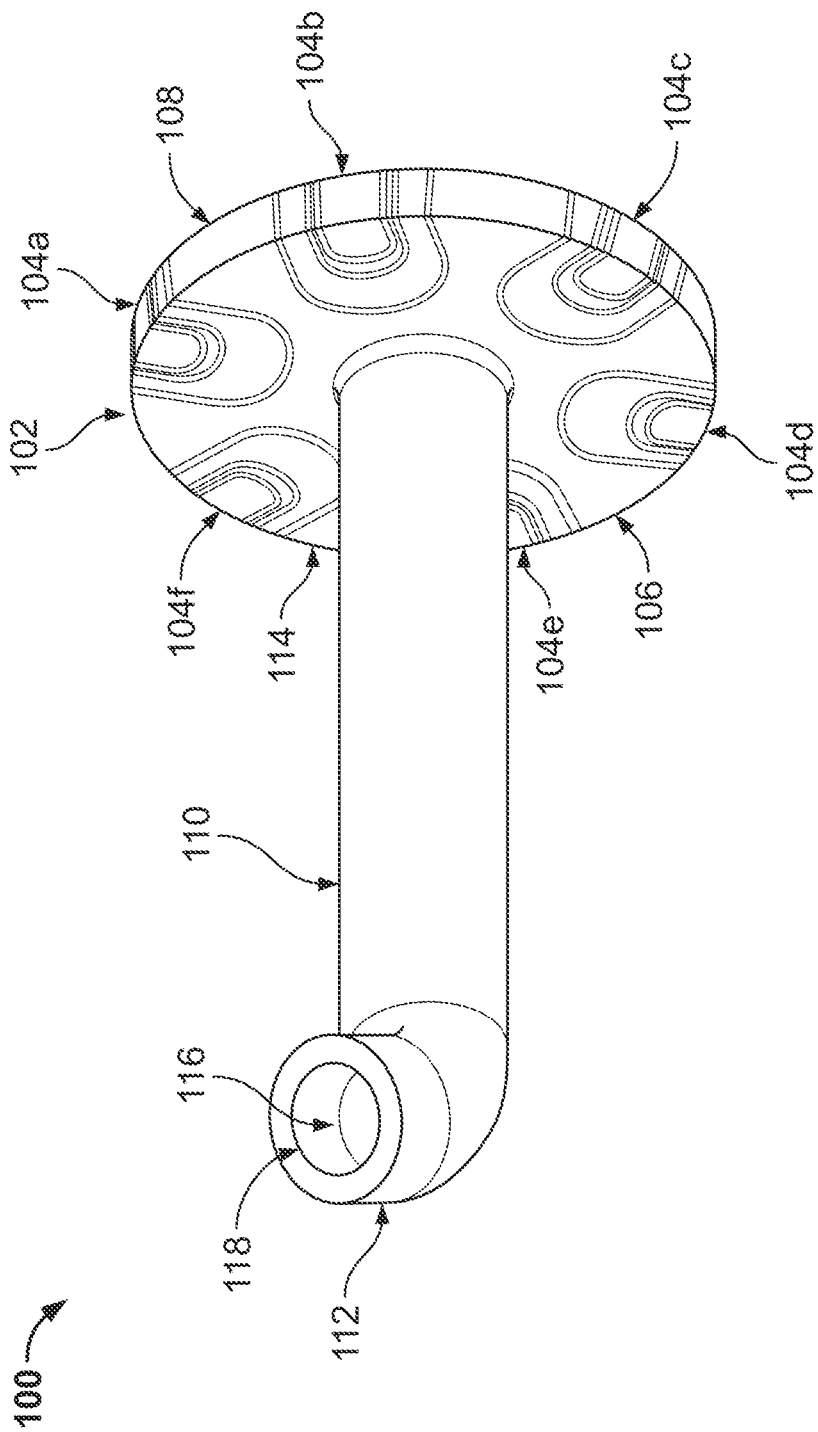
FIG. 1 shows an embodiment of an insert device.

Conduits will sometimes need to be sealed in certain conditions. These conditions include hazardous locations or environments that need to mitigate effects of airflow in conduits due to temperature or pressure gradients. Conduit seals can be used to provide seals in hazardous locations to quarantine potentially explosive liquids or vapors from sparking equipment. Conduit seals can also mitigate heating or cooling requirements, as well as condensation. In addition, conduit seals can limit ingress of rodents or other pests into buildings or other facilities.

Existing methods of sealing conduits require significant time and material costs to prepare a seal. Due to difficulty separating wires, installation need to be attempted more than once to achieve desired sealing effect. Temperature effects may also reduce adhesion between the filler compound and the conduit walls. Some methods require fiber dams, such as strips of foam or other materials, inside the conduit to entrap sealant prior to curing. Significant time and effort are often required as the wires must be pulled and adjusted twice to achieve confidence that the wires are separated from each other, due to common long lengths of conduit runs. This step can alone occupy multiple people and much of the time to prepare the seal. Also, slippage of the foam strips along the wires is expected as the wires are pulled in the conduit to adjust for proper distance between foam strips. Lastly, one is not expected to have a high level of confidence of injected foam fill, due to compliance of foam strips (due at least in part to lack of visual inspection and lack of access).

The present disclosure offers a device that fits inside a conduit, which separates cables (e.g., conductors such as wires) from each other as well as from conduit walls. The device can be easily inserted into a conduit from inside a conduit body. In some examples, the insert has two planes which inhibit a fluid (e.g., an injected foam) from freely passing, as well as a nozzle, allowing for precise injection of fluid into the space between the two planes. In this way, an installer has a quick, reliable and repeatable manner to provide for an internal conduit seal against passage of fluids or pests. In addition, this method does not require large scale movement of cables in the conduit (common wiggling of the cables can be used), so that only a single installer is needed. After the device is inserted into place in the conduit, a sealant can be delivered to the device (e.g., via a nozzle, if present) to provide a conduit seal. In some examples, only the nozzle of the device is visible from the conduit opening when delivering the sealant to the device.

The present disclosure applies to commercial and industrial applications. The present disclosure can be used in applications that demand or desire sealing of a conduit. These applications include explosive environments or food & beverage facilities, for instance. A general application of the present disclosure includes a conduit system that needs to be sealed, such as a conduit system passing from one environment to another. The device of the present disclosure teaches a cable-separating component for sealing of a conduit for mitigation of fluid conveyance along the inside of conduit. The present disclosure presents a number of benefits including: reduction in part count compared to known solutions; reduction in worktime to create a seal in the conduit (reduction in workers needed as well); reduction in installer variations and errors for creating sealed interface; retrofit ready (cables do not need to be moved as in current solutions); reliable performance; improved adhesion to conduit walls (compared to brittle, hazardous location-solution); and reduced shock/fracture effects (compared to brittle, hazardous location-solution).

FIG. 1 displays a device 100 for positioning cables (e.g., wires) and sealing a conduit, according to some embodiments. The device 100 includes a cable-separating component 102 and a nozzle 110. The cable-separating component 102 has a first end 106 and a second end 108. The first end 106 is opposite the second end 108 along the body of the cable-separating component 102. As shown in FIG. 1, the cable-separating component 102 is connected to the nozzle 110. Although the description is directed towards positioning cables, the device can be used to position a variety of conduits and other components (e.g., rope, multiple wires inside a sheath, or fiberglass cable).

The body of the cable-separating component 102 has removable portions 104-a, 104-b, 104-c, 104-d, 104-e, and 104-f (collectively referred to as the removable portions 104). When the removable portions 104 are removed from the body of the cable-separating component 102, the body has notches configured to secure a cable (See FIG. 3A, FIG. 3B, FIG. 4 and FIG. 5 for examples and further discussion of the removable portions 104 with respect to the cable-separating component 102 with notches).

In some embodiments, the cable-separating component 102 tapers downwards and away from the nozzle 110. Stated another way, the diameter for the first end 106 is greater than the diameter for the second end 108; the body reduces in diameter from the first end 106 to the second end 108. The cable-separating component 102 has a tapered edge to further ease insertion of the cable-separating component 102, and the device 100 as a whole, into the conduit. The cable-separating component 102 can also be flexible to accommodate wide range of conduit sizes.

The nozzle 110 has a body that defines a tubular channel 116. The nozzle 110 includes a first end 112 and a second end 114. The second end 114 is opposite the first end 112 along the body of the nozzle 110. The second end 114 of the nozzle 110 connects to the first end 106 of the cable-separating component 102. The tubular channel 116 of the nozzle 110 extends from the first end 112 and connects to a tubular channel (not shown) of the cable-separating component 102. The tubular channel of the cable-separating component 102 extends from the first end 106 to the second end 108. The tubular channel 116 of the nozzle 110 and the tubular channel of the cable-separating component 102 form a continuous channel from the nozzle opening 118 to the second end 108 of the cable-separating component 102. Stated another way, the second end 114 of the nozzle 110 is connected to the cable-separating component 102 such that the tubular channel 116 continues entirely through the body of the cable-separating component 102.

The first end 112 of the nozzle 110 includes a nozzle opening 118. The tubular channel 116 can be accessed by the nozzle opening 118. A fluid can flow from the nozzle opening 118 through the continuous channel formed by the nozzle 110 and cable-separating component 102 to an exterior space adjacent to the second end 108 of the cable-separating component 102. In some examples, a longitudinal centerline of the nozzle 110 extends substantially parallel to a longitudinal centerline of the device 100.

A user can remove a portion or all of the removable portions 104. With a newly created notch by removing the removable portions 104 or a pre-existing notch, a user can connect the cables to the device 100. After the cables are connected to the device 100 and placed in the notches, the device 100 can be placed in the conduit and slid into a desired location. For example, moving the device to the desired position within the conduit comprises sliding the device 100 longitudinally along the conduit and away from the nozzle opening 118 of the conduit. After the device 100 is in place in the conduit, a sealant or other fluid can be delivered to the device 100 (via the nozzle opening 118, if the nozzle 110 is present). The sealant can form a seal to the conduit and prevent flow of a fluid in the conduit.

In some examples, the sealant is polyurethane or silicone. In some examples, delivering the sealant to the device 100 comprises delivering a foamed polymer. In some embodiments, additives can be added to the sealant to improve the qualities of the sealant, including but not limited to the UV resistance, antimicrobial, conductivity, mechanical and thermal stability, chemical resistance, insulation property and flammability. The additives can include, but are not limited to, ceramics, alumina, calcium silicate, flame retardants, expandable graphite and clays. Blowing agents can also be added to the formulation to achieve foaming structures. Possible blowing agents may be ammonium polyphosphate, melamine phosphate, urea, urea-formaldehyde resins, dicyandiamide, melamine or glycine. The additives may be in the range of 0% to 50%, or any intervening number or a smaller range within 0% to 50%, by mass in the device 100. For example, the additives in the device 100 may be about 12% by mass or from about 15% to about 25%. Besides a sealant, other fluids or materials can be delivered to the device 100. For example, metal or other filler can be delivered to the device 100 to resist rodents or other pests.

The device 100 can be made of a single material. Alternatively, some components of the device can be made of different materials. For example, the cable-separating component 102 and the nozzle 110 can be made of a different material than one another. In some embodiments, the device 100 is injection molded via thermoplastic materials, compression (compression or transfer molding) molded via thermoset materials or potted. The present disclosure provides for the device 100 to include materials such as thermosetting plastics, silicone rubber gels, or epoxy resins.

Examples of thermoplastic materials that may be used include one or more polymer composite materials, including but not limited to polyolefins, such as polypropylene, polyethylene, low density polyethylene, high density polyethylene, acetal and ketal based polymers and copolymers, polyesters (e.g., polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers can also be implemented, including but not limited to polyvinyl chloride (PVC), polyetherimide (PEI), polyphenylene sulfide (PPS), polyether ether ketone (PEEK), polyphthalamide (PPA), polyoxymethylene (POM), phenolformaldehyd (PF), unsaturated polyester (UP), polyurethane (PUR and PU), polyimide, polyamide, polyvinyl alcohol, polyvinylidene chloride, polyacrylonitrile and polyalkylene paraoxybenzoate.

Examples of thermoset materials include but are not limited to epoxies, polyester, such as polyester bulk molding compounds (BMC), and phenolics. Rubbers, such as nitril rubbers, butyl rubbers, neoprene, EPDM rubber (ethylene propylene diene monomer rubber), and silicone can also be used. The thermoset materials, including rubbers, can be used in a potted process.

In some embodiments, the material of the device 100 can include a variety of types of fibers, including but not limited to carbon fiber, glass fiber, wool, silk, cotton, rayon, cellulose, cellulose acetate, flax, ramie, jute and aramid fibers. For example, the device 100 can made of a polymeric composite with wool.

In some embodiments, additives can be added to the materials of the device 100 to improve the qualities of the materials, including but not limited to the UV resistance, antimicrobial, conductivity, mechanical and thermal stability, chemical resistance, insulation property and flammability. The additives can include, but are not limited to, ceramics, alumina, calcium silicate, flame retardants, expandable graphite and clays. Blowing agents can also be added to the formulation to achieve foaming structures. Possible blowing agents may be ammonium polyphosphate, melamine phosphate, urea, urea-formaldehyde resins, dicyandiamide, melamine or glycine. The additives may be in the range of 0% to 50%, or any intervening number or a smaller range within 0% to 50%, by mass in the device 100. For example, the additives in the device 100 may be about 12% by mass or from about 15% to about 25%.

The device 100 may need to be rigid or flexible depending on the shape of the conduit and environmental conditions. In some examples, the device 100 can have a durometer range of about 40 Shore A to about 100 Shore A, or any intervening number. For example, the device 100 can have a durometer range of about 50 Shore A to about 70 Shore A.

The device 100 may have a variety of shapes and sizes, depending on the conduit, to achieve a proper seal. Although the cross-sectional shape of the device 100 is shown as cylindrical, other geometries (e.g., triangular or hexagonal) may be used. The geometry of the device 100 may be symmetrical or non-symmetrical. Components of the device 100 may have different geometries from one another. The geometries of the notches of the removable portions 104, the removable portions 104, the cable-separating component 102, and the nozzle 110 may have some, all or no matching geometries. For example, the nozzle 110 may be corrugated on an interior or exterior surface, and the cable-separating component 102 may be smooth. As another example, the removable portions 104 may have an oval-shaped cross-section and the cable-separating component 102 may have a circular cross-section.

Figure 2:
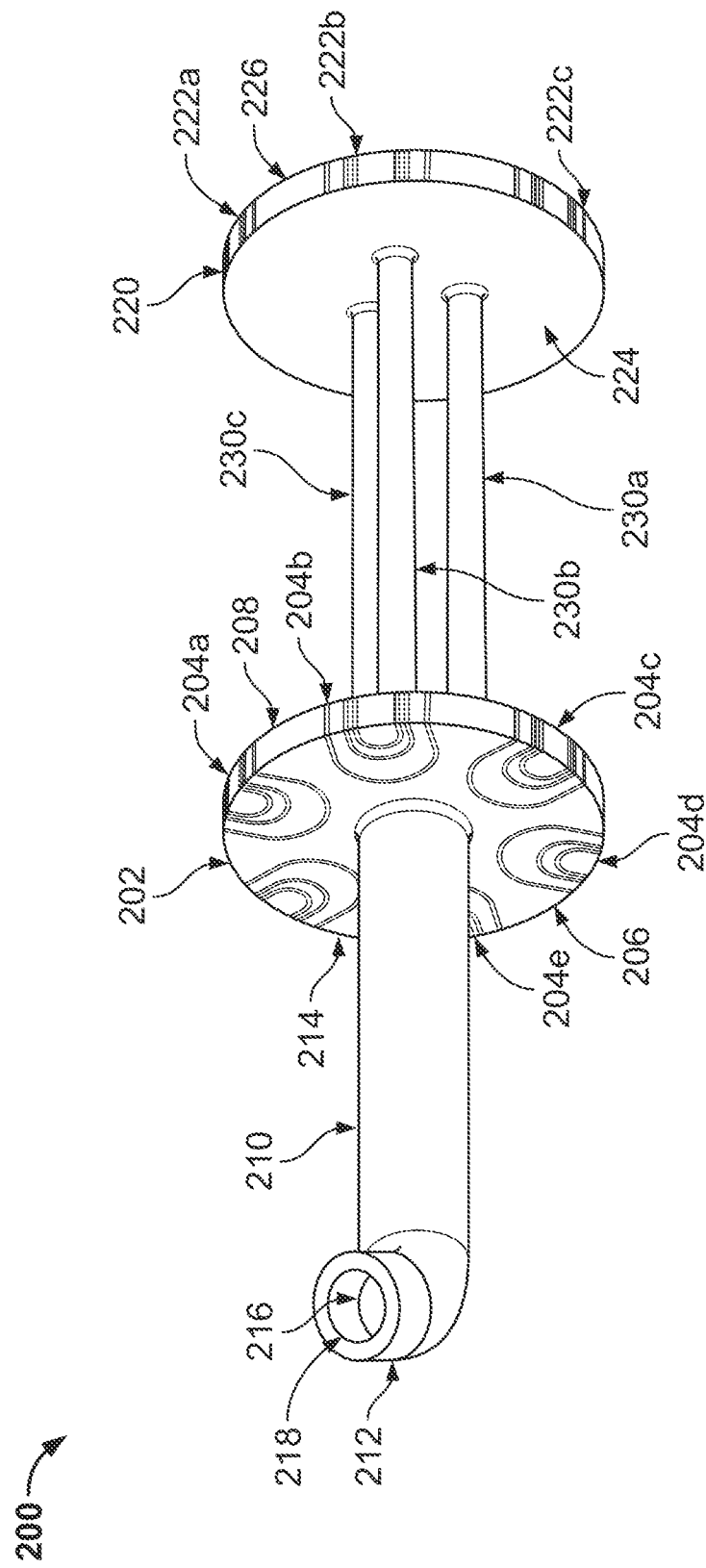
FIG. 2 shows another embodiment of an insert device.

FIG. 2 displays a device 200 for positioning cables and sealing a conduit, according to some embodiments. FIG. 2 displays an embodiment for a device with an additional cable-separating component, a second cable-separating component 220. For certain features, the device 200 is the same or similar to the device 100. Accordingly, similar reference numbers are used. For example, FIG. 1 describes the nozzle 110; FIG. 2 describes a nozzle 210. Some of the differences between the device 100 and the device 200 are discussed. However, it will be appreciated that other differences may exist without departing from the scope of the present disclosure.

FIG. 2 displays the device 200 for positioning cables and sealing a conduit. The device 200 includes a first cable-separating component 202 with removable portions 204-a, 204-b, 204-c, 204-d, 204-e, and 204-f (collectively referred to as removable portions 204). The first cable-separating component 202 has a first end 206 and a second end 208. The first cable-separating component 202 is connected to the nozzle 210 as shown in FIG. 2. The nozzle 210 has a body that defines a tubular channel 216. The nozzle 210 includes a first end 212 and a second end 214. The first end 212 of the nozzle 210 includes a nozzle opening 218.

In comparison to the device 100, the device 200 includes the second cable-separating component 220 and a strut 230-a, a strut 230-b, and a strut 230-c (collectively, struts 230). In some examples, the second cable-separating component 220 is the same as, or substantially similar to, the first cable-separating component 202 and/or cable-separating component 102. The second cable-separating component 220 includes the removable portions 222-a, 222-b, 222-c, 222-d, 222-e, and 222-f (collectively referred to as the removable portions 222; the removable portions 222-a, 222-b, and 222-c are visible in FIG. 2; the removable portions 222-d, 222-e, and 222-f are present but not visible from the view of FIG. 2). In some examples, the removable portions 104, 204, and 222 are the same or substantially similar to one another.

The struts 230 connect the first cable-separating component 202 to the second cable-separating component 220. Although the embodiment depicted in FIG. 2 displays three struts 230, there may be one or more struts 230 connecting the first cable-separating component 202 to the second cable-separating component 220. For example, there may be one strut 230 or ten struts 230. The struts 230 can be of the same material or a different material than the other components of the device 200. For example, the struts 230 may be made of a different material (e.g., more or less rigid) than the first cable-separating component 202 and/or the second cable-separating component 220. The struts can also differ from one another (e.g., shape, size, and material). There can be a combination of the struts 230 that are the same and different from one another.

The length of the struts 230 determines a volume that is defined between the first cable-separating component 202 and the second cable-separating component 220. The first cable-separating component 202 and the second cable-separating component 220 can contain a sealant delivered via the nozzle 210. By increasing the length of the struts 230, the volume occupied between the first cable-separating component 202 and the second cable-separating component 220 will be greater. Likewise, by decreasing the length of the struts 230, the volume occupied between the first cable-separating component 202 and the second cable-separating component 220 will decrease. Depending on the application of the device 200, the amount of sealant that is delivered to the device 200 may need to change. When a large amount of sealant needs to be delivered, the volume defined by the first cable-separating component 202 and the second cable-separating component 220 may need to be sized accordingly and be large also. Consequently, the struts 230 will need to be long to create a large volume for the sealant. Similarly, when a small amount of sealant is need, the struts 230 can be shorter.

In some embodiments, the device 100 and the device 200 are one integral piece. That is, the device 100 and the device 200 can be made of a one-piece construction. In some embodiments, the device can include an additional cable-separating component, similar to the second cable-separating component 220, and additional struts, similar to the struts 230, to create additional volumes for sealant. These additional struts and cable separating components would be added to the device 200 in a similar manner as the struts 230 and the second cable-separating component 220 were added to the device 100. In some embodiments, the device 200 may not include the struts 230. That is, the device 200 only includes the first cable-separating component 202, the nozzle 210, and the second cable-separating component 220.

Figure 3A:
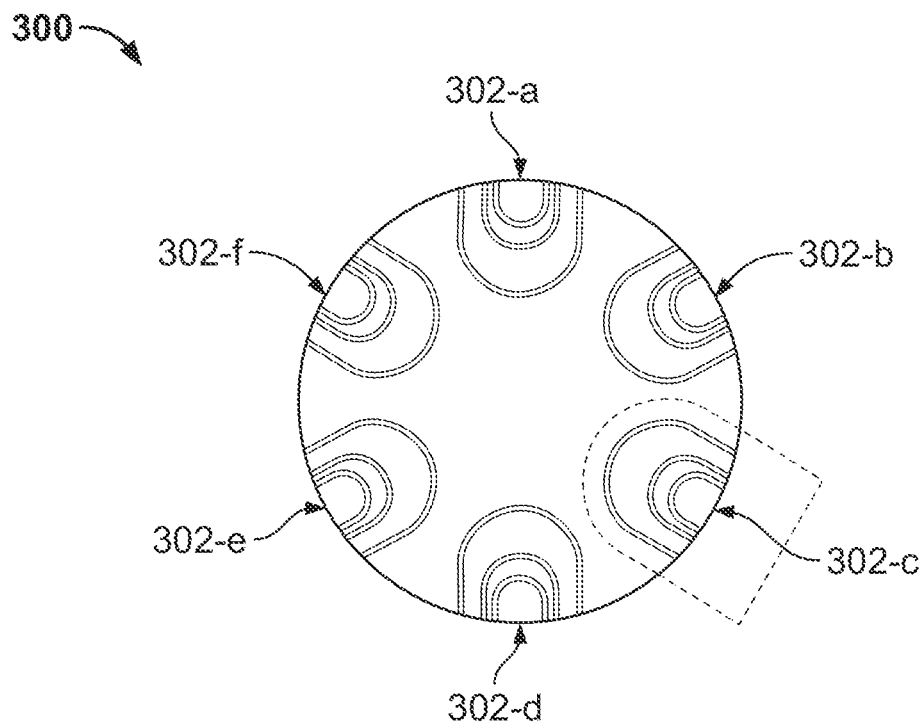
FIG. 3A shows an embodiment of a component of an insert device.

FIG. 3A displays a cable-separating component 300, according to some of the embodiments. The cable-separating component 300 includes removable portions 302-*a*, 302-*b*, 302-*c*, 302-*d*, 302-*e*, and 302-*f* (collectively referred to as removable portions 302). In some examples, the cable-separating component 300 is the same or similar to the cable-separating component 102, the first cable-separating component 202, and/or the second cable-separating component 220. In some examples, the removable portions 104, 204, 222, and 302 are the same or substantially similar to one another. FIG. 3A displays six removable portions 302. In some embodiments, there can be one or more removable portions 302. For example, there can be one removable portion 302 or ten removable portions 302. The removable portions 302 do not have to be symmetrically placed around the cable-separating component 300. For example, the removable portions 302 can be grouped on one half of the cable-separating component 300.

Although FIG. 3A depicts the removable portions 302 as all being the same, the removable portions 302 can also differ from one another. For example, the removable portions 302 can have different shapes and sizes from one another. In one cable-separating component 300, the removable portions 302 can be all the same or all different. The cable-separating component 300 can also have removable portions 302 that are the same and different. For example, two removable portions 302 may match, and there may be two additional removable portions 302 that do not match any of the other removable portions 302. In some embodiments, the cable-separating component 300 may not include the removable portions 302. Instead, a user can create notches with a tool.

Figure 3B:
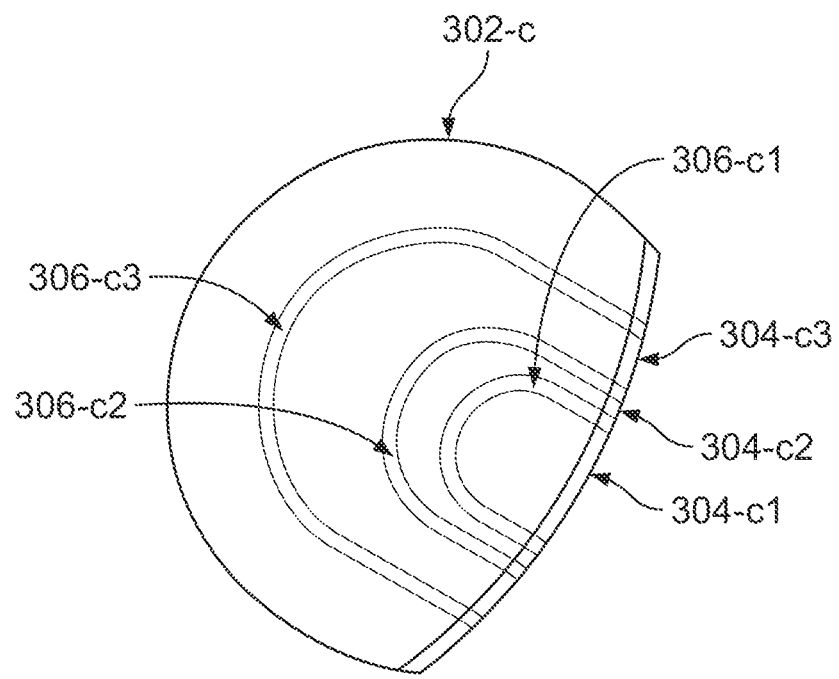
FIG. 3B shows an exemplary notch portion of the embodiment shown in FIG. 3A.

FIG. 3B displays a detailed section of the removable portion 302-*c* in FIG. 3A. The removable portion 302-*c* includes a first knockout portion 304-*c*1 defined by a first weakened portion 306-*c*1, a second knockout portion 304-*c*2 defined by a second weakened portion 306-*c*2, and a third knockout portion 304-*c*3 defined by a third weakened portion 306-*c*3.

The first weakened portion 306-*c*1, the second weakened portion 306-*c*2, and the third weakened portion 306-*c*3 (collectively, the weakened portions 306-*c*) are weakened portions of the removable portion 302-*c*. The weakened portions 306-*c* can be used to enable removal of the first knockout portion 304-*c*1, the second knockout portion 304-*c*2, and the third knockout portion 304-*c*3, respectively (collectively, the knockout portions 304-*c*).

The weakened portions 306-*c* can be accomplished by a variety of different means. For example, the weakened portions 306-*c* can be a portion of the removable portion 302-*c* with a reduced amount of material. Stated another way, the weakened portions 306-*c* can have a reduced cross-sectional width relative to other portions of the removable portion 302-*c*. In other examples, the weakened portions 306-*c* can also, or alternatively, be perforated. These two examples are not exhaustive and other means can be used to ease the knockout portions 304-*c* removal from the removable portion 302-*c*.

The knockout portions 304-*c* and the weakened portions 306-*c* can have a variety of shapes/geometries and sizes. Similar to the description of the removable portions 302, knockout portions 304-*c* and the weakened portions 306-*c* can all be the same, all be different, or some different and some the same. For example, the first weakened portion 306-*c*1 can have a size of 14 American Wire Gauge (AWG), the second weakened portion 306-*c*2 can have a size of 10 AWG, and the third weakened portion 306-*c*3 can have a size of 6 AWG.

FIG. 3B display three knockout portions 304-*c* and three weakened portions 306-*c*. However, depending on the application, the removable portion 302-*c* can have one or more knockout portions 304-*c* and weakened portions 306-*c*. For example, there can be one knockout portion 304-*c* or ten knockout portions 304-*c*.

Figure 4:
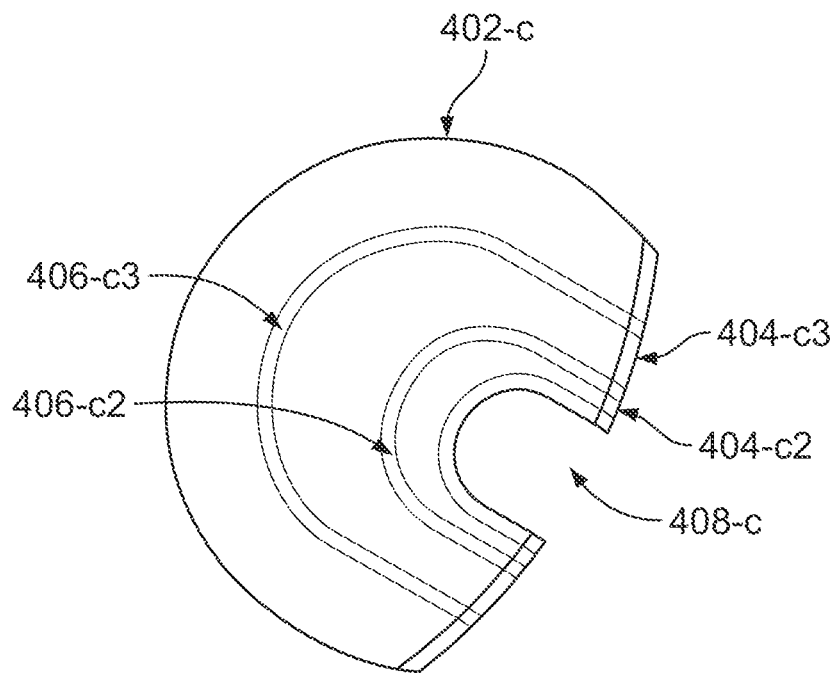
FIG. 4 shows an embodiment of a notch portion.

FIG. 4 displays a removable portion 402-*c*, according to some of the embodiments. For certain features, the removable portion 402-*c* is the same or similar to the removable portion 302-*c* and the removable portions 104, 204, and 222. FIG. 4 displays the removable portion 402-*c*, which is the removable portion 302-*c* after the first knockout portion 304-*c*1 has been removed. Accordingly, similar reference numbers are used. For example, FIG. 3B describes the third knockout portion 304-*c*3; FIG. 4 describes a third knockout portion 404-c3. Some of the differences between the removable portion 302-c and the removable portion 402-c are discussed. That is, the removable portion 402-c is missing a knockout portion and instead has a notch 408-c. It will be appreciated that other differences may exist without departing from the scope of the present disclosure.

The removable portion 402-c includes the notch 408-c (after having a first knockout portion removed; the first knockout portion is not shown since it has been removed), a second knockout portion 404-c2 defined by a second weakened portion 406-c2, and a third knockout portion 404-c3 defined by a third weakened portion 406-c3. For FIG. 4, the notch 408-c was formed by removing a knockout portion. In some examples, the notch 408-c can be pre-formed and also have one or more knockout portions (e.g., the second knockout portion 404-c2 and the third knockout portion 404-c3 around the notch 408-c). Stated another way, instead of removing a knockout portion to form a notch, there may be a pre-existing notch (e.g., the notch 408-c) and knockout portions (e.g., the second knockout portion 404-c2 and the third knockout portion 404-c3) surrounding the preexisting notch (e.g., the notch 408-c).

In some examples, there may not be the second knockout portion 404-c2, the third knockout portion 404-c3, the second weakened portion 406-c2, and the third weakened portion 406-c3, only the notch 408-c exists in the removable portion 402-c. The notch 408-c may be preexisting, a user may have made it with a tool, or a user may have removed a single knockout portion. A user may then further enlarge the removable portion 402-c with a tool.

Depending on user specifications, the size of the notch 408-c may need to be varied. The smallest knockout portion (e.g., the second knockout portion 404-c2) can be removed for smaller wire, and progressively more portions of the removable portion 402-c may be removed for greater wire sizes. Also, if fewer numbers of cables are used, then removable portions (e.g., the removable portion 402-c) may be allowed to be unaltered.

With regards to FIG. 4, multiple knockout portions (e.g., second knockout portion 404-c2 and/or third knockout portion 404-c3) can be successively removed to progressively enlarge the notch 408-c. The second knockout portion 404-c2 and third knockout portion 404-c3 can be successively removed to progressively enlarge the notch 408-c. For example, a cable may be larger than size of the notch 408-c. In order to accommodate the larger cable, the second knockout portion 404-c2 can be removed from the removable portion 402-c to increase the size of notch 408-c. If the notch is still not large enough for the cable, the third knockout portion 404-c3 can be removed to further increase the size of the notch 408-c.

Figure 5:
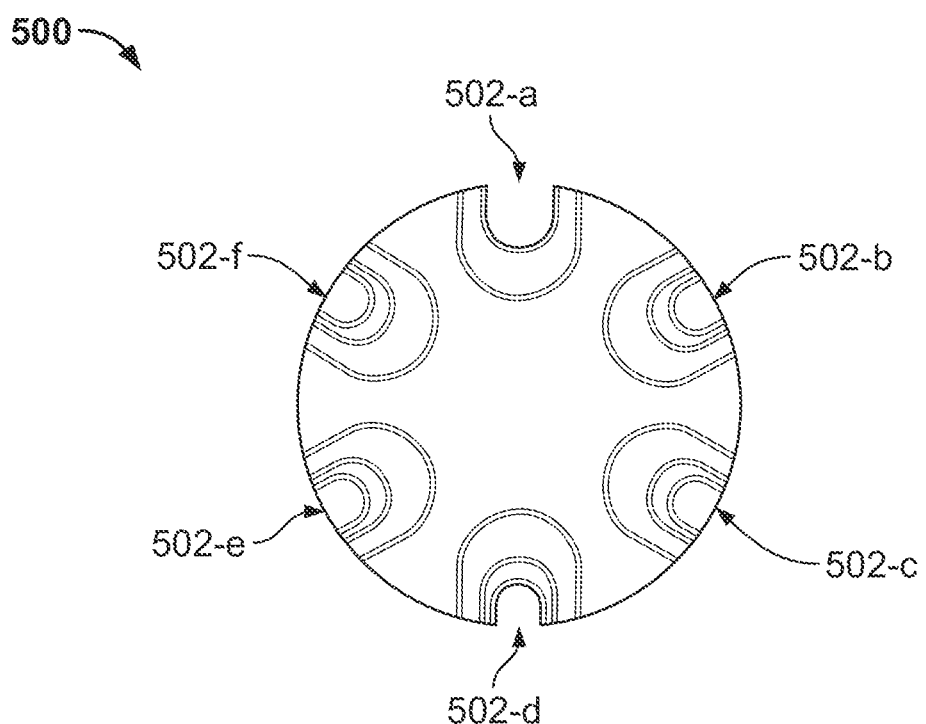
FIG. 5 shows an embodiment of a component of an insert device.

FIG. 5 displays a cable-separating component 500, according to some of the embodiments. The cable-separating component 500 includes removable portions 502-a, 502-b, 502-c, 502-d, 502-e, and 502-f (collectively referred to as removable portions 502). Cable-separating component 500 is the same or similar to the cable-separating component 102, the first cable-separating component 202, the second cable-separating component 220, and/or the cable-separating component 300. Some of the differences are discussed. It will be appreciated that other differences may exist without departing from the scope of the present disclosure. Removable portion 502-a includes one weakened portion, one knockout portion, and one notch. Removable portion 502-d includes two weakened portions, two knockout portions, and one notch. Removable portions 502-b, 502-c, 502-e, and 502-f include three weakened portions three knockout portions, and no notch. The notches for the removable portion 502-a and 502-d can be pre-formed. That is, the cable-separating component 500 can be manufactured to have pre-existing notches, and the notches can be present when provided to a user. In contrast, a user may have removed have knockout portions to reveal the notches for the removable portion 502-a and 502-d.

Figure 6A:
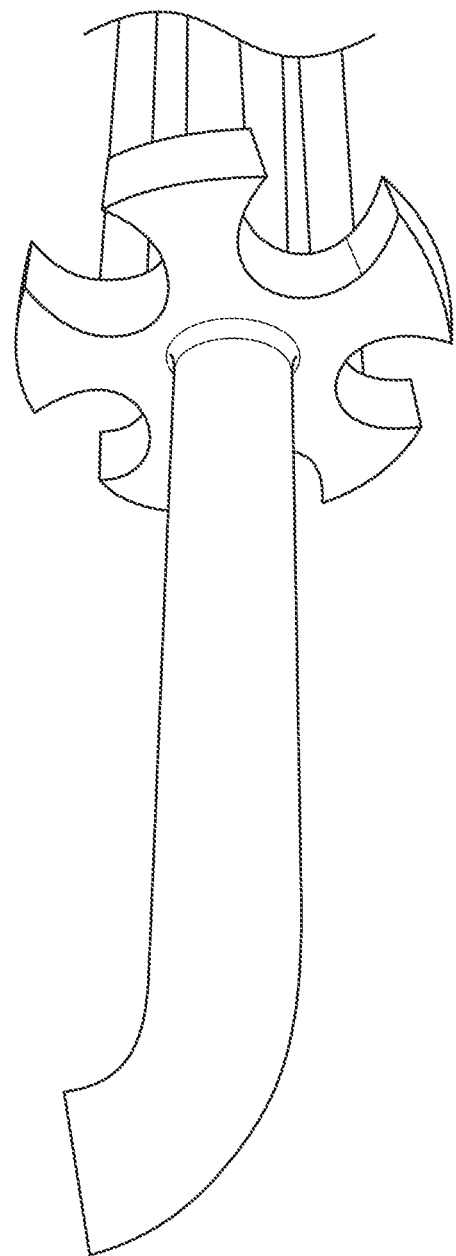
FIGS. 6A and 6B show different views of an embodiment of an insert device.
Figure 6B:
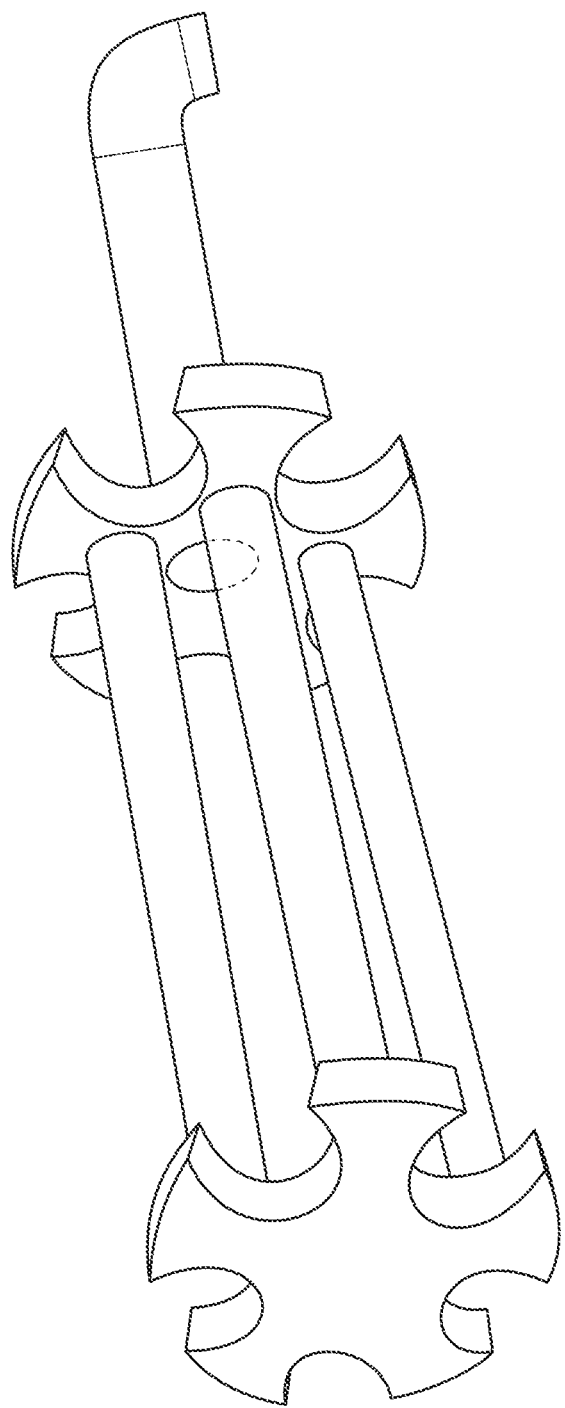

FIGS. 6A and 6B depict the same exemplary embodiment from different perspectives. FIG. 6A depicts the nozzle of the device, the first cable-separating component, and the struts. FIG. 6B depicts almost the whole device, including the first and second cable-separating component, the struts, and part of the nozzle.

Figure 7:
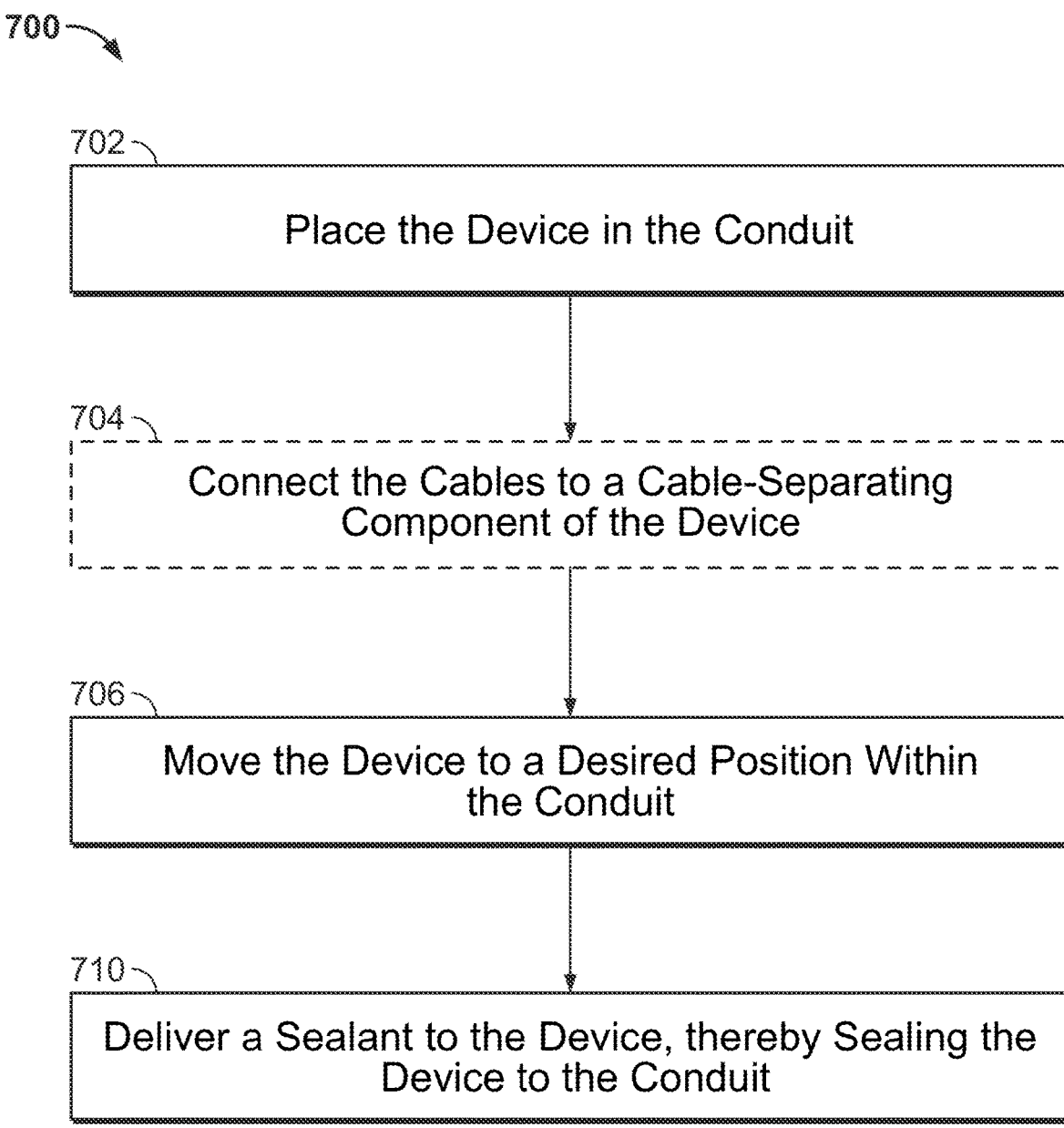
FIG. 7 shows a flowchart for a method according to some of the embodiments.

FIG. 7 shows an exemplary flowchart for a method 700 according to some of the embodiments of the methods for installing the device 100 for separating cables and sealing a conduit. The device 100 can be any of the embodiments as described herein. The method 700 includes placing 702 the device, according to any of the embodiments described herein, in the conduit. Then, connecting 704 the cables to a cable-separating component of the device. The dashed line for step 704 indicates that the step is optional. In some embodiments, no cables are connected to the device and the device is used to seal a conduit. The method 700 includes moving 708 the device to a desired position within the conduit. Then, delivering 710 a sealant to the device, thereby sealing the device to the conduit.

In some embodiments, before connecting 704 the cables to a cable-separating component of the device, the method 700 includes removing the removable portions from the body to form notches on the body. In some embodiments, connecting the cables to the cable-separating component of the device comprises placing the cables in the notches. In some embodiments there may be pre-existing notches as well as removable portions in the device, placing the cables in the notches may or may not include removing the removable portions. For example, the device may include two preexisting notches and two removable portions, depending on the size and number of cables, the preexisting notches and removable portions may or may not be used. If the removable portions are not removed, the removable portions can stay attached to the body of the cable-separating component.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device for positioning cables and sealing a conduit, comprising:
    a cable-separating component comprising:
        a first body comprising:
            removable portions arranged around an outer periphery of the first body,
            wherein when the removable portions are removed from the first body, the first body defines a first notch configured to secure a cable; and
a nozzle comprising:
a second body,
wherein the second body defines a tubular channel,
a first end, and
a second end,
wherein the second end is opposite the first end along the second body, wherein the second end is connected to the first body of the cable-separating component such that the tubular channel continues entirely through the first body of the cable-separating component.

2. The device of claim 1, further comprising:
a second cable-separating component,
wherein the second cable-separating component is connected to the cable-separating component,
wherein the second cable-separating component includes:
a second body,
wherein the second body is configured with another removable portions, wherein when the another removable portions are removed from the second body, the second body defines a second notch,
wherein the second notch is configured to secure the cable.

3. The device of claim 2, further comprising:
at least one strut,
wherein the second cable-separating component is connected to the cable-separating component via the at least one strut.

4. The device of claim 2, wherein the cable-separating component and the second cable-separating component are made of a different material than the nozzle.

5. The device of claim 2, wherein the cable-separating component and the second cable-separating component comprise a polymer.

6. The device of claim 2, wherein the cable-separating component and the second cable-separating component are flexible with a durometer range of about 40 Shore A to about 100 Shore A.

7. The device of claim 1, wherein the removable portions include multiple knockout portions for each first notch, wherein the multiple knockout portions can be successively removed to progressively enlarge the first notch.

8. The device of claim 1, wherein the cable-separating component tapers downwards and away from the nozzle.

9. The device of claim 1, wherein a longitudinal centerline of the nozzle extends substantially parallel to a longitudinal centerline of the device.

10. The device of claim 1, wherein the nozzle is corrugated.

11. A method of installing a device for separating cables and sealing a conduit, comprising:
placing the device in the conduit;
connecting the cables to a cable-separating component of the device;
moving the device to a desired position within the conduit; and
delivering a sealant to the device, thereby sealing the device to the conduit;
wherein the cable-separating component includes a body, the body being configured with removable portions arranged around an outer periphery of the body.

12. The method of claim 11,
the method further comprising:
removing the removable portions from the body to form notches on the body.

13. The method of claim 12, wherein the connecting the cables to the cable-separating component of the device comprises placing the cables in the notches.

14. The method of claim 11, wherein the cable-separating component includes:
a body,
wherein the body is configured with notches and removable portions to enlarge the notches; and
wherein the connecting the cables to the cable-separating component of the device comprises placing the cables in the notches.

15. The method of claim 14, wherein the placing the cables in the notches comprises leaving the removable portions attached to the body.

16. The method of claim 11, wherein the delivering the sealant to the device comprises delivering the sealant to the device via a nozzle of the device.

17. The method of claim 11, wherein the delivering the sealant to the device comprises delivering an irritant.

18. The method of claim 11, wherein the delivering the sealant to the device comprises delivering a foamed polymer.

19. The method of claim 11, wherein the moving the device to the desired position within the conduit comprises sliding the device longitudinally along the conduit and away from an opening of the conduit.

20. The method of claim 19, wherein the delivering the sealant to the device is performed after the moving the device to the desired position within the conduit.

* * * * *